US012220930B2

(12) United States Patent
Gejima

(10) Patent No.: US 12,220,930 B2
(45) Date of Patent: Feb. 11, 2025

(54) LIQUID DISCHARGE HEAD AND RECORDING DEVICE

(71) Applicant: KYOCERA Corporation, Kyoto (JP)

(72) Inventor: Kenko Gejima, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 18/425,592

(22) Filed: Jan. 29, 2024

(65) Prior Publication Data

US 2024/0165979 A1 May 23, 2024

Related U.S. Application Data

(63) Continuation of application No. 17/877,545, filed on Jul. 29, 2022, now Pat. No. 11,919,322, which is a (Continued)

(30) Foreign Application Priority Data

Dec. 25, 2014 (JP) ................................ 2014-262681

(51) Int. Cl.
*B41J 29/377* (2006.01)
*B41J 2/14* (2006.01)
*B41J 2/21* (2006.01)

(52) U.S. Cl.
CPC ......... *B41J 29/377* (2013.01); *B41J 2/14209* (2013.01); *B41J 2/14233* (2013.01); (Continued)

(58) Field of Classification Search
CPC .. B41J 29/377; B41J 2/14209; B41J 2/14233; B41J 2/21; B41J 2202/21; (Continued)

(56) References Cited

U.S. PATENT DOCUMENTS 6,910,759 B2 6/2005 Kawamura et al.
6,981,760 B2 1/2006 Yamamoto
(Continued)

FOREIGN PATENT DOCUMENTS

CN 106660365 A 5/2017
JP 2000-211125 A 8/2000
(Continued)

OTHER PUBLICATIONS

International Search Report, PCT/JP2016/065706, Aug. 9, 2016, 1 pg.

(Continued)

*Primary Examiner* — Sharon Polk
(74) *Attorney, Agent, or Firm* — Volpe Koenig

(57) ABSTRACT

A liquid discharge head is provided in which heat of a heat sink is less apt to transfer to a head body. The liquid discharge head includes a primary flow channel member and a secondary flow channel member. The secondary flow channel member comprises a first surface, a second surface opposite the first surface, a plurality of discharge holes opened in the first surface, and a plurality of pressurizing chambers communicated with the discharge holes. The primary flow channel member is on the second surface and supplies a liquid to the pressurizing chambers, and includes a first opening for supplying a liquid to the primary flow channel member, a second opening for collecting the liquid from the primary flow channel member, and a flow channel configured using resin.

13 Claims, 7 Drawing Sheets

Related U.S. Application Data continuation of application No. 17/000,132, filed on Aug. 21, 2020, now Pat. No. 11,420,458, which is a continuation of application No. 16/399,403, filed on Apr. 30, 2019, now Pat. No. 10,752,033, which is a continuation of application No. 15/539,254, filed as application No. PCT/JP2015/085781 on Dec. 22, 2015, now Pat. No. 10,315,447.

(52) U.S. Cl.
CPC ........ *B41J 2/21* (2013.01); *B41J 2002/14459* (2013.01); *B41J 2002/14491* (2013.01); *B41J 2202/08* (2013.01); *B41J 2202/12* (2013.01); *B41J 2202/20* (2013.01); *B41J 2202/21* (2013.01)

(58) Field of Classification Search
CPC .... B41J 2002/14459; B41J 2002/14491; B41J 2202/12; B41J 2202/20
See application file for complete search history.

(56) References Cited

U.S. PATENT DOCUMENTS

| | | | |
|---|---|---|---|
| 7,267,432 | B2 | 9/2007 | Hibi et al. |
| 8,276,250 | B2 | 10/2012 | Wijingaards et al. |
| 8,398,214 | B2 | 3/2013 | Okubo |
| 8,794,734 | B2 | 8/2014 | Owaki |
| 9,150,019 | B2 | 10/2015 | Takeuchi et al. |
| 9,333,746 | B2 | 5/2016 | Nagamochi et al. |
| 9,744,760 | B2 | 8/2017 | Yamada et al. |
| 10,293,608 | B2 | 5/2019 | Gejima |
| 10,315,447 | B2 | 6/2019 | Gejima |
| 11,420,458 | B2 | 8/2022 | Gejima |
| 2004/0257393 | A1 | 12/2004 | Merz |
| 2007/0052764 | A1 | 3/2007 | Oku et al. |
| 2007/0091150 | A1 | 4/2007 | Kodama |
| 2011/0085012 | A1 | 4/2011 | Nishikawa et al. |
| 2011/0228011 | A1 | 9/2011 | Kyoso |
| 2012/0160925 | A1 | 6/2012 | Hoisington et al. |
| 2012/0176450 | A1 | 7/2012 | Akahane et al. |
| 2013/0050338 | A1 | 2/2013 | Shimosato |
| 2013/0076834 | A1 | 3/2013 | Nosaka et al. |
| 2013/0076838 | A1 | 3/2013 | Suzuki et al. |
| 2013/0120504 | A1 | 5/2013 | Yanata et al. |
| 2013/0162725 | A1 | 6/2013 | Suzuki et al. |
| 2014/0104348 | A1 | 4/2014 | Owaki et al. |
| 2014/0292909 | A1 | 10/2014 | Watanabe et al. |
| 2015/0042723 | A1 | 2/2015 | Fukuda |
| 2015/0077490 | A1 | 3/2015 | Miyasaka |
| 2015/0283808 | A1 | 10/2015 | Shimosato et al. |
| 2016/0185113 | A1 | 6/2016 | Yoshida et al. |
| 2017/0151792 | A1 | 6/2017 | Kobayashi et al. |
| 2017/0182772 | A1 | 6/2017 | Gejima et al. |

FOREIGN PATENT DOCUMENTS

| | | | |
|---|---|---|---|
| JP | 2001-232788 | A | 8/2001 |
| JP | 2002-079682 | A | 3/2002 |
| JP | 2004-209655 | A | 7/2004 |
| JP | 2004-291484 | A | 10/2004 |
| JP | 2005-186293 | A | 7/2005 |
| JP | 2010-012650 | A | 1/2010 |
| JP | 2010-201937 | A | 9/2010 |
| JP | 2011-079251 | A | 4/2011 |
| JP | 2012-011629 | A | 1/2012 |
| JP | 2012-143948 | A | 8/2012 |
| JP | 2013-067145 | A | 4/2013 |
| JP | 2013-180405 | A | 9/2013 |
| JP | 2014-028452 | A | 2/2014 |
| JP | 2014-046627 | A | 3/2014 |
| JP | 2014-104714 | A | 6/2014 |
| JP | 2014-162076 | A | 9/2014 |
| JP | 2014-162192 | A | 9/2014 |
| JP | 2014-223801 | A | 12/2014 |
| JP | 2014-237323 | A | 12/2014 |
| JP | 2016-124191 | A | 7/2016 |

OTHER PUBLICATIONS

Japanese Office Action with English concise explanation, Japanese Patent Application No. 2016-566376, Feb. 13, 2018, 3 pgs.

LIQUID DISCHARGE HEAD AND RECORDING DEVICE

CROSS-REFERENCE TO RELATED APPLICATIONS

This application is a continuation application of U.S. patent application Ser. No. 17/877,545, filed Jul. 29, 2022, which is a continuation application of U.S. patent application No. 17/000,132, filed Aug. 21, 2020, now U.S. Pat. No. 11,420,458, which is a continuation application of U.S. patent application Ser. No. 16/399,403, filed Apr. 30, 2019, now U.S. Pat. No. 10,752,033, which is a continuation application of U.S. patent application Ser. No. 15/539,254, filed Jun. 23, 2017, now U.S. Pat. No. 10,315,447, which claims the benefit of International Patent Application No. PCT/JP2015/085781, filed Dec. 22, 2015, which claims the benefit of Japanese Patent Application No. 2014-262681, filed on Dec. 25, 2014, the contents of which are incorporated herein by reference.

TECHNICAL FIELD

The present invention relates to a liquid discharge head and a recording device.

BACKGROUND ART

As a liquid discharge head, for example, there has conventionally been known one which includes a head body having a discharge hole for discharging a liquid therethrough, a driver IC to control driving of the head body, a casing which is disposed on the head body and has an opening on a side surface thereof, and a heat sink which is disposed on the opening of the casing and configured to dissipate heat generated in the driver IC (refer to, for example, Patent Document 1).

PRIOR ART DOCUMENT

Patent Document

Patent Document 1: Japanese Unexamined Patent Publication No. 2000-211125

SUMMARY OF THE INVENTION

Problems to be Solved by the Invention

However, even though the heat of the driver IC is dissipated to the heat sink, the heat can be transferred from the heat sink to the head body.

Means for Solving the Problems

A liquid discharge head according to an embodiment of the present invention includes a head body including a discharge hole for discharging a liquid therethrough, a driver IC configured to control driving of the head body, a casing which is disposed on the head body and has an opening on a side surface of the casing, a heat sink which is disposed on the opening of the casing and configured to dissipate heat generated in the driver IC, and a thermal insulation part disposed between the heat sink and the head body.

A recording device according to an embodiment of the present invention includes the liquid discharge head as described above, a transport section configured to transport a recording medium while causing the recording medium to face the discharge hole of the liquid discharge head, and a control section configured to control the driver IC of the liquid discharge head.

Effect of the Present Invention

It is possible to reduce thermal conduction from the heat sink to the head body.

EMBODIMENTS FOR CARRYING OUT THE INVENTION

First Embodiment

Figure 1A:
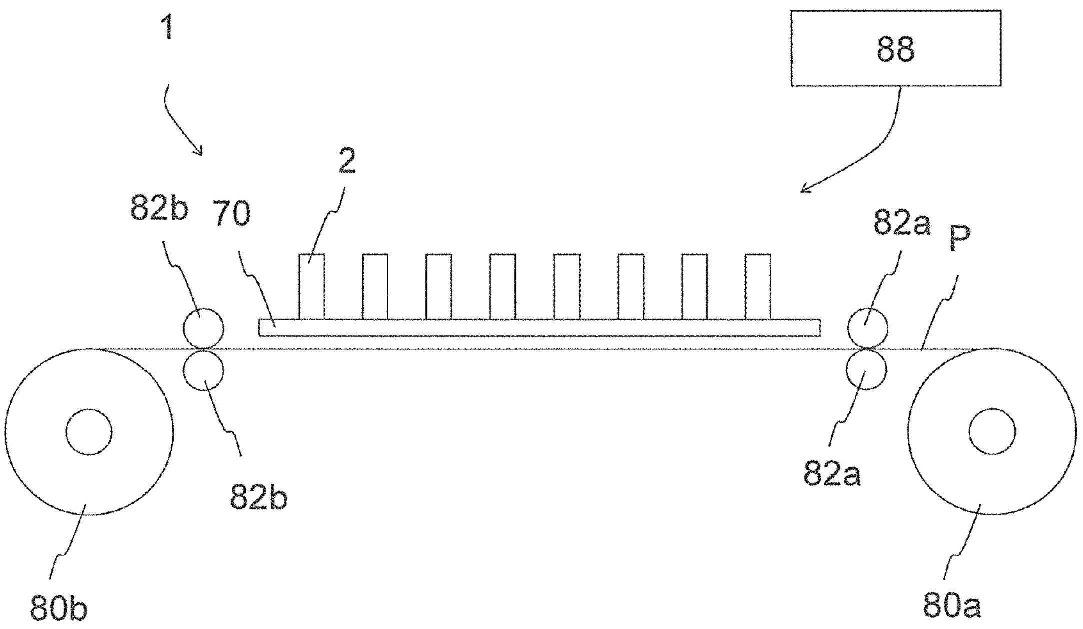
FIG. 1(*a*) is a side view of a recording device including a liquid discharge head according to a first embodiment, and FIG. 1(*b*) is a plan view thereof.
Figure 1B:
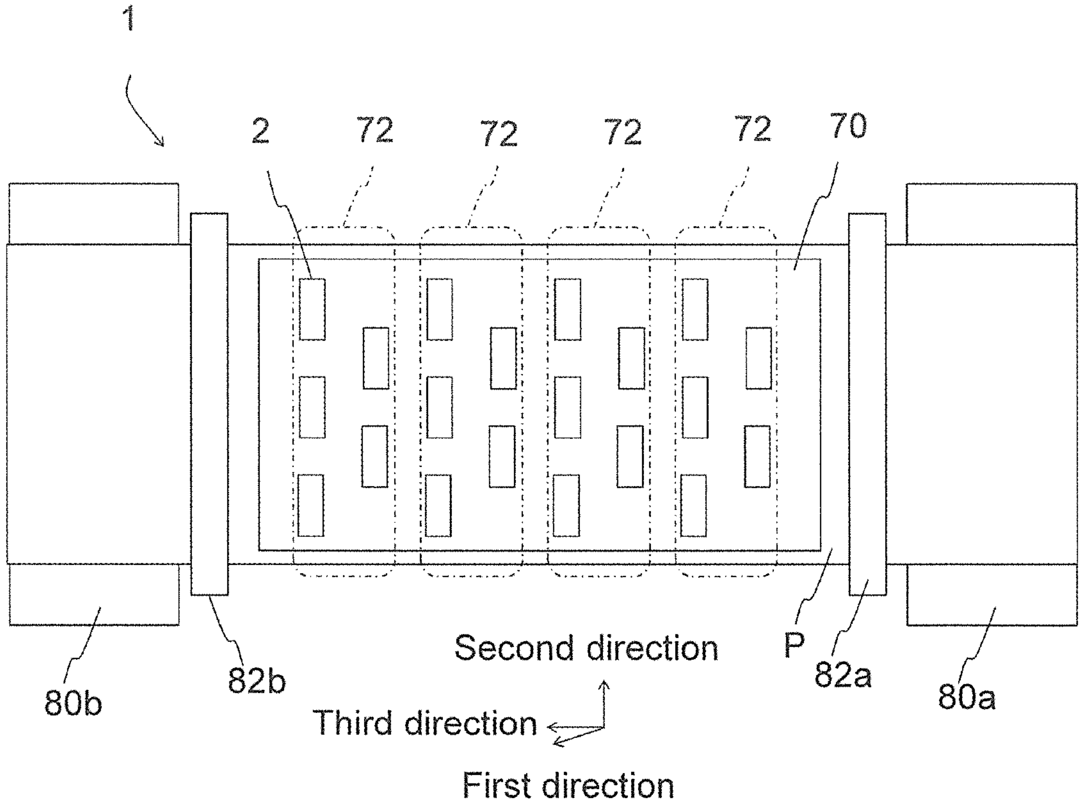
Figure 4A:
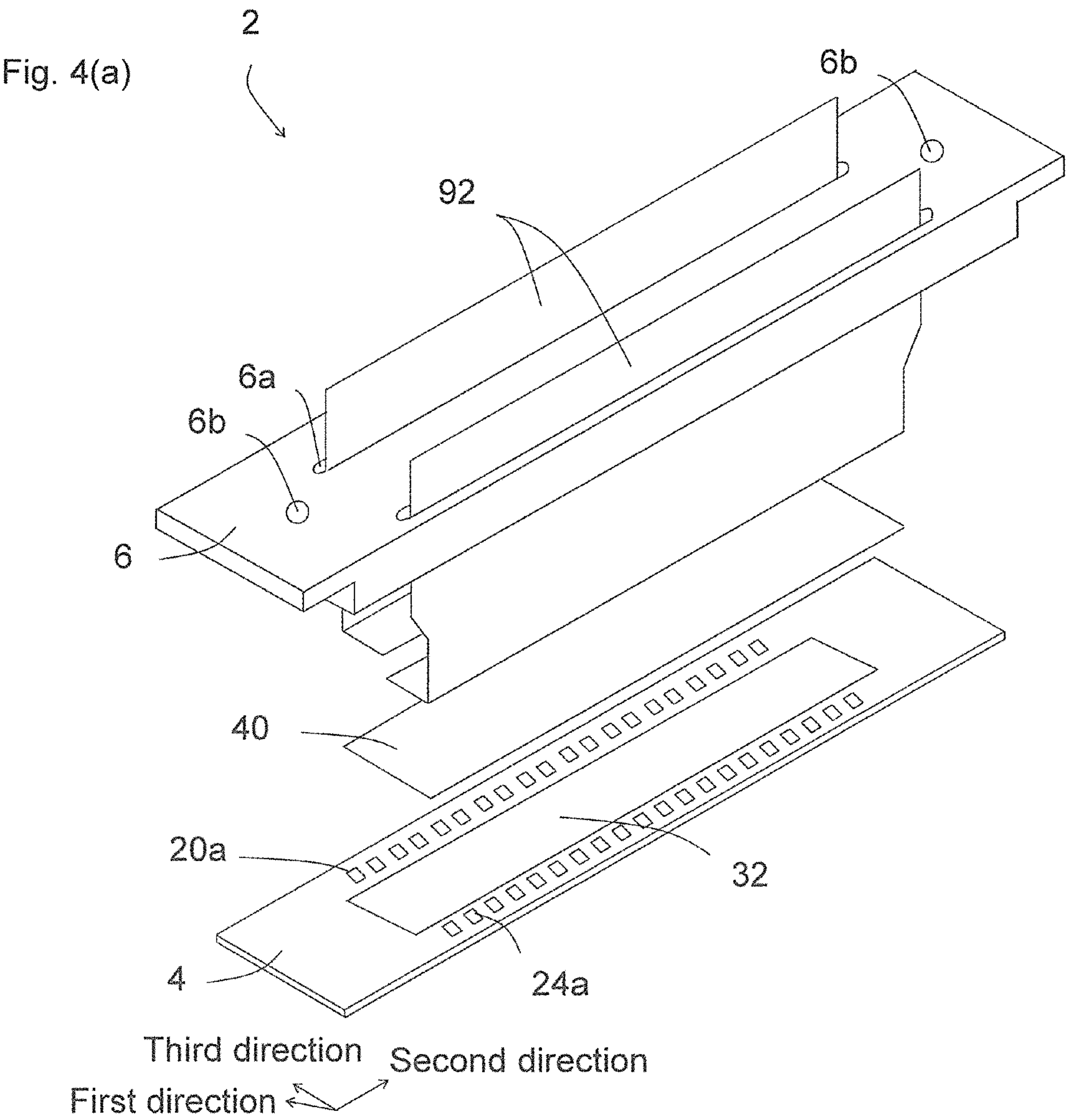
FIG. 4(*a*) is an exploded perspective view that shows a second flow channel member and the neighborhood thereof in the liquid discharge head shown in FIG. 1, and FIG. 4(*b*) is a sectional view thereof.
Figure 4B:
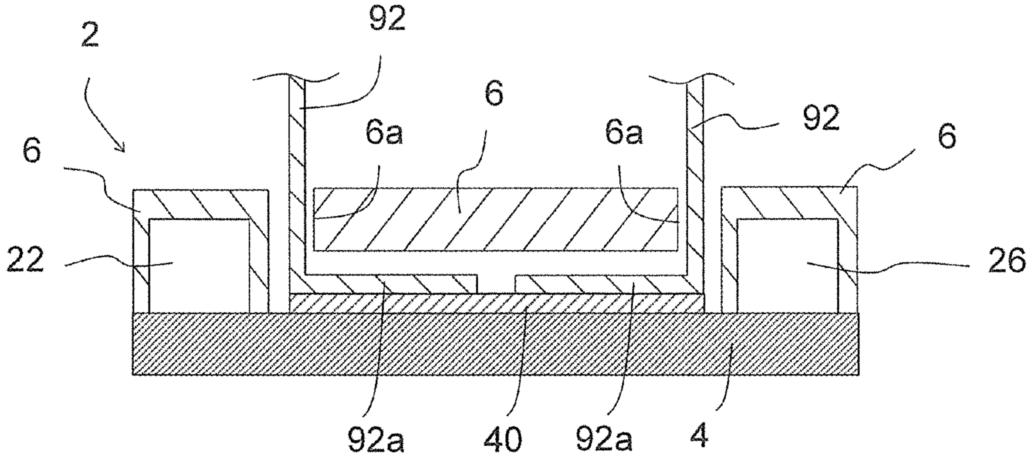
Figure 5:
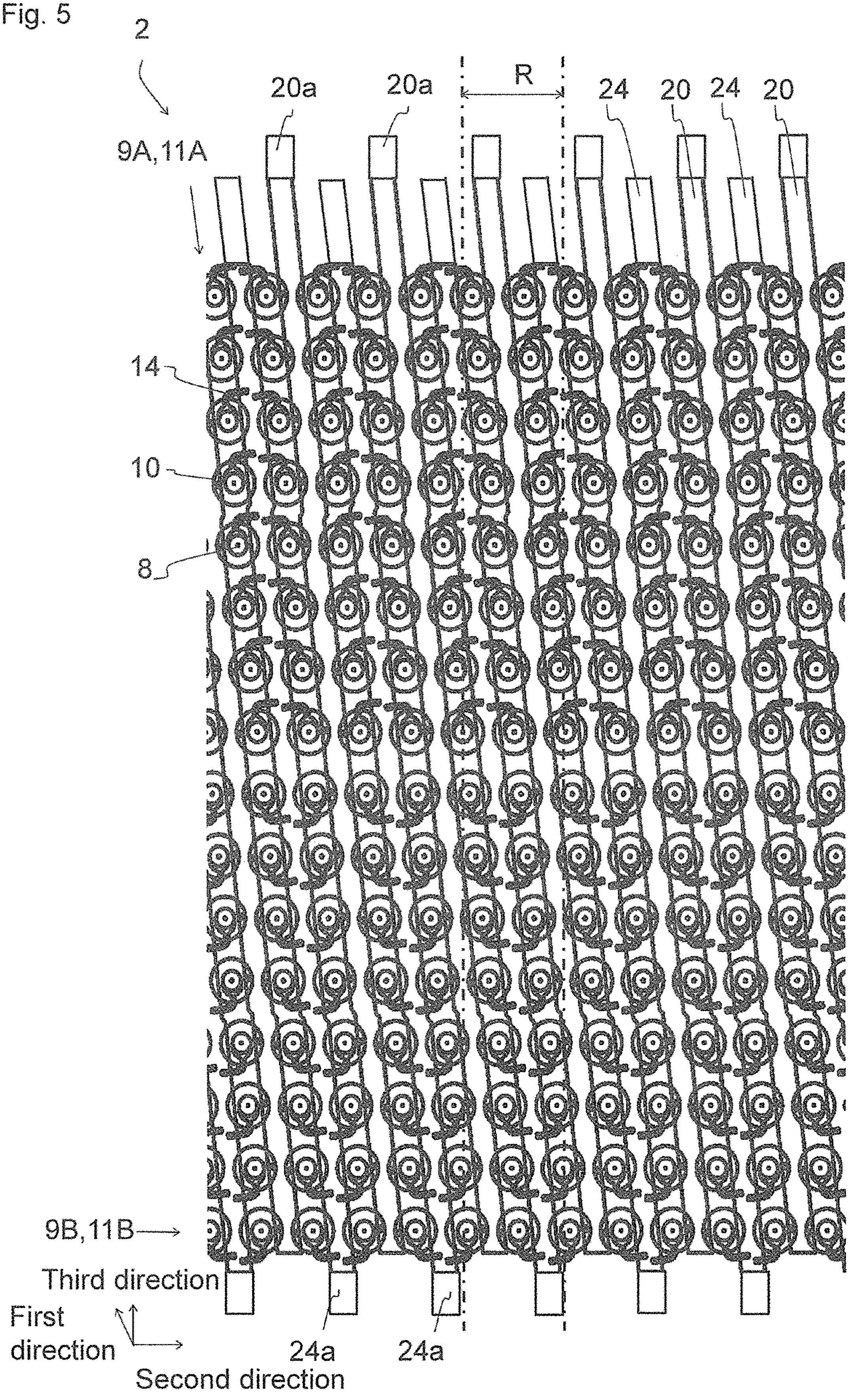
FIG. 5 is a partial enlarged plan view of the liquid discharge head shown in FIG. 4.

FIG. 1(*a*) is a side view that shows an outline of a recording device 1 including a liquid discharge head 2 according to an embodiment of the present invention. FIG. 1(*b*) is a plan view that shows an outline of the recording device 1. An extending direction of a secondary supply flow channel 20 and a secondary recovery flow channel 24 in FIG. 5 is referred to as a first direction. An extending direction of a primary supply flow channel 20 and a primary recovery flow channel 26 in FIG. 4 is referred to as a second direction. A direction orthogonal to the second direction is referred to as a third direction.

The recording device 1 relatively moves a printing paper P as a recording medium in a transport direction relative to the liquid discharge head 2 by transporting the printing paper P from a transport roller 80*a* to a transport roller 80*b*. A control section 88 controls the liquid discharge head 2 on the basis of image data and character data, and performs recording, such as printing, on the printing paper P by causing a liquid to be discharged from the liquid discharge head 2 toward the recording medium P so as to cause liquid drops to land on the printing paper P. Specifically, the control section 88 controls driving of a driver IC 93 (refer to FIG. 2) mounted on the liquid discharge head 2.

In the present embodiment, the liquid discharge head 2 is fixed to the recording device 1, and the recording device 1 is a so-called line recording device. Examples of other embodiments of the recording device of the present invention include a so-called serial recording device.

A tabular frame 70 is fixed to the recording device 1 so as to be approximately parallel to the printing paper P. The frame 70 is provided with twenty holes (not shown), and twenty liquid discharge heads 2 are mounted on their respective corresponding holes. Portions of the liquid discharge heads 2, through which a liquid is discharged, are so arranged as to face the printing paper P. A distance between the liquid discharged heads 2 and the printing paper P is settable to, for example, approximately 0.5-20 mm. Five liquid discharge heads 2 constitute a head group 72. The recording device 1 has four head groups 72.

The liquid discharge heads 2 have an elongated shape being long and narrow in the second direction. Three liquid discharge heads 2 in the head group 72 are disposed side by side along the second direction, and the remaining two liquid discharge heads 2 are respectively disposed between the three liquid discharge heads 2 and located at positions deviated from the three liquid discharge heads 2 in the second direction.

The liquid discharge heads 2 are disposed so that their respective printable ranges are continuous with one another in a longitudinal direction of the liquid discharge heads 2, or are overlapped with one another via their respective edges of the ranges. This achieves printing without leaving any blank space in a width direction of the printing paper P.

The four head groups 72 are disposed along the transport direction. A liquid (ink) is supplied from a liquid tank (not shown) to each of the liquid discharge heads 2. Inks of the same color are suppliable to the liquid discharge heads 2 belonging to the single head group 72, and inks of four colors are printable by the four head groups 72. The colors of the inks to be discharged from the head groups 72 are, for example, magenta (M), yellow (Y), cyan (C), and black (K). A color image is printable by performing printing under control of the control section 88.

The number of the liquid discharge heads 2 mounted on the recording device 1 may be one for printing with a single color over the range printable by the single liquid discharge head 2. The number of the liquid discharge heads 2 included in the head group 72, or the number of the head groups 72 is suitably changeable according to a printing object and printing conditions. For example, the number of the head groups 72 may be increased in order to perform more multicolor printing. A printing speed (transport velocity) can be increased by disposing a plurality of the head groups 72 that perform printing with the same color so as to alternately perform printing in the transport direction. Alternatively, resolution in the width direction of the printing paper P may be enhanced by preparing a plurality of the head groups 72 that perform printing with the same color, and disposing these head groups 72 with a deviation in the second direction.

Besides printing colored inks, a liquid, such as a coating agent, may be printed to carry out a surface treatment of the printing paper P.

The recording device 1 performs printing on the printing paper P. The printing paper P is being wound up onto a paper feed roller 80*a*. After the printing paper P passes through between two guide rollers 82*a*, the printing paper P passes under the liquid discharge heads 2 mounted on the frame 70, and then passes through between two transport rollers 82*b*, and is finally recovered onto a recovery roller 80*b*. When performing printing, the printing paper P is transported at a constant velocity and subjected to printing by the liquid discharged heads 2 by rotating the transport rollers 82*b*. The recovery roller 80*b* winds up the printing paper P fed out of the transport rollers 82*b*. The transport velocity is settable to, for example, 75 m/min. Each of these rollers may be controlled by the control section 88, or may be manually operated by an operator.

The recording medium may be a cloth or building material, such as a tile, besides the printing paper P. The recording device 1 may be configured to transport a transport belt instead of the printing paper P. Besides roll-shaped ones, the recording medium may be, for example, sheet papers, cut cloths, wood, or tiles, which are put on the transport belt. Further, for example, wiring patterns of electronic devices may be printed by causing a liquid containing conductive particles to be discharged from the liquid discharge heads 2. Furthermore, chemicals may be manufactured by causing a predetermined amount of each of a liquid chemical agent and a liquid containing a chemical agent to be discharged from the liquid discharge heads 2 toward a reaction vessel or the like, followed by a reaction therebetween.

For example, a position sensor, a velocity sensor, and a temperature sensor may be attached to the recording device 1, and the control section 88 may control components of the recording device 1 according to states of the components of the recording device 1, which are revealed from information from these sensors. In particular, when discharge characteristics (such as a discharge rate and a discharge velocity) of the liquid to be discharged from the liquid discharge head 2 are subject to external influence, a drive signal for discharging the liquid in the liquid discharge head 2 needs to changed according to a temperature of the liquid discharge head 2, a temperature of the liquid in the liquid tank, and a pressure being applied to the liquid discharge head 2 by the liquid in the liquid tank.

The liquid discharge head 2 according to an embodiment of the present invention is described below with reference to FIGS. 2 to 6. A support plate to support a wiring board 94, and a second member 96 are omitted from FIG. 2.

The liquid discharge head 2 includes a head body 2*a*, a primary flow channel member 6, a signal transmission member 92, the wiring board 94, a pressing member 97, a casing 91, a thermal insulation part 91*e*, and a heat sink 90. The primary flow channel member 6, the signal transmission member 92, the wiring board 94, and the pressing member 97 are not necessarily needed. The head body 2*a* includes a secondary flow channel member 4, and an actuator board 40 disposed on the secondary flow channel member 4.

The primary flow channel member 6 is disposed on the secondary flow channel member 4 of the head body 2*a*, and the primary flow channel member 6 is configured to supply a liquid to the head body 2*a*. The primary flow channel member 6 has openings 6*b* respectively at both ends thereof in a main scanning direction. The liquid is supplied from the exterior to the openings 6*b*, and the liquid is then supplied to the primary flow channel member 6. The primary flow channel member 6 includes therein a primary supply flow channel 22 (refer to FIG. 4) and a primary recovery flow channel 26 (refer to FIG. 4). The liquid is supplied to the secondary flow channel member 4 through the primary supply channel 22 and the primary recovery flow channel 26.

The wiring board 94 is disposed above the head body 2*a*, and the signal transmission section 92 led from the head body 2*a* is electrically connected to the wiring board 94. The casing 91 is disposed so as to cover the signal transmission member 92 and the wiring board 94, and includes the heat sink 90 therein.

The head body 2*a* has a discharge hole 8 for discharging the liquid therethrough (refer to FIG. 5). The head body 2*a* includes the primary flow channel member 6, the secondary flow channel member 4, and the actuator board 40. The head body 2*a* extends long in the second direction, and the actuator board 40 is disposed on the secondary flow channel member 4. The primary flow channel member 6 is disposed so as to surround the actuator board 40, and the signal transmission member 92 is drawn upward from the opening 6*a*.

The casing 91 is disposed on the head body 2*a*. The casing 91 extends long in the second direction, and includes a first opening 91*a*, a second opening 91*b*, a third opening 91*c*, and a fourth opening 91*d*. The casing 91 has the first opening 91*a* and the second opening 91*b* on a side surface thereof being opposite to the third direction. The casing 91 has the third opening 91*c* on a lower surface thereof. The casing 91 has the fourth opening 91*d* on an upper surface thereof.

The thermal insulation part 91*e* is disposed adjacent to the first opening 91*a* and the second opening 91*b*, and the heat sink 90 is disposed on the thermal insulation part 91*e*. The thermal insulation part 91*e* is formed integrally with the casing 90, and projectedly disposed outwardly from the side surface of the casing 90 which is opposite to the third direction. The thermal insulation part 91*e* is formed so as to extend in the second direction. Therefore, the heat sink 90 is disposed on the head body 2*a* with the thermal insulation part 91*e* and the primary flow channel member 6 interposed therebetween.

The casing 91 seals the signal transmission member 92 and the wiring board 94 by being mounted on the head body 2*a* so as to cover the signal transmission member 92 and the wiring board 94 from above. The casing 91 is disposed so as to cover the signal transmission member 92, the driver IC 93, and the wiring board 94. The casing 91 is formable from a resin or metal.

A first heat sink 90*a* is disposed on the first opening 91*a* so as to close the first opening 91*a*, and the first heat sink 90*a* is disposed on the thermal insulation part 91*e*. A second heat sink 90*b* is disposed on the second opening 91*b* so as to close the second opening 91*b*, and the second heat sink 90*b* is disposed on the thermal insulation part 91*e*. The heat sink 90 is fixed to the casing 91 by, for example, an adhesive, such as a resin, or a screw. Therefore, the casing 91 with the heat sink 90 fixed thereto is in the shape of a box in which the third opening 91*c* is opened.

The third opening 91*c* is disposed on the lower surface so as to face the primary flow channel member 6. The third opening 91*c* permits insertion of the signal transmission member 92, the wiring board 94, and the pressing member 97 so that the signal transmission member 92, the wiring board 94, and the pressing member 97 are disposed in the casing 91.

The fourth opening 91*d* is disposed on the upper surface in order to permit insertion of a connector (not shown) disposed on the wiring board 94. The space between the connector and the fourth opening 91*d* is preferably sealed with a resin or the like. This makes it possible to prevent the liquid or dust from entering the casing 91.

The heat sink 90 includes the first heat sink 90*a* and the second heat sink 90*b*. The heat sink 90 extends long in the second direction, and is made of metal or alloy having high heat dissipation performance. The heat sink 90 is disposed so as to be in contact with the driver IC 93, and has a function of dissipating heat generated in the driver IC 93.

The signal transmission member 92 includes a first signal transmission member 92*a* disposed on a side of the first heat sink 90*a*, and a second signal transmission member 92*b* disposed on a side of the second heat sink 90*b*. The signal transmission member 92 is configured to transmit a signal sent thereto from the exterior to the head body 2*a*.

One end portion of the signal transmission member 92 is electrically connected to the actuator board 40. The other end portion of the signal transmission member 92 is drawn out upwardly so as to pass through the opening 6*a* of the primary flow channel member 6, and is electrically connected to the wiring board 94. Thus, the actuator board 40 and the exterior are electrically connected to each other. An FPC (Flexible Printed Circuit) is exemplified as the signal transmission member 92.

The driver IC 93 is disposed on the signal transmission member 92. The driver IC 93 includes a first driver IC 93*a* disposed on the first signal transmission member 92*a*, and a second driver IC 93*b* disposed on the second signal transmission member 92*b*. The driver IC 93 is configured to drive the actuator board 40 thereby drive the liquid discharge head 2 according to a signal sent from the control section 88 (refer to FIG. 1).

The wiring board 94 is disposed above the head body 2*a* by a support plate. The wiring board 94 has a function of distributing signals to the driver IC 93.

Figure 3A:
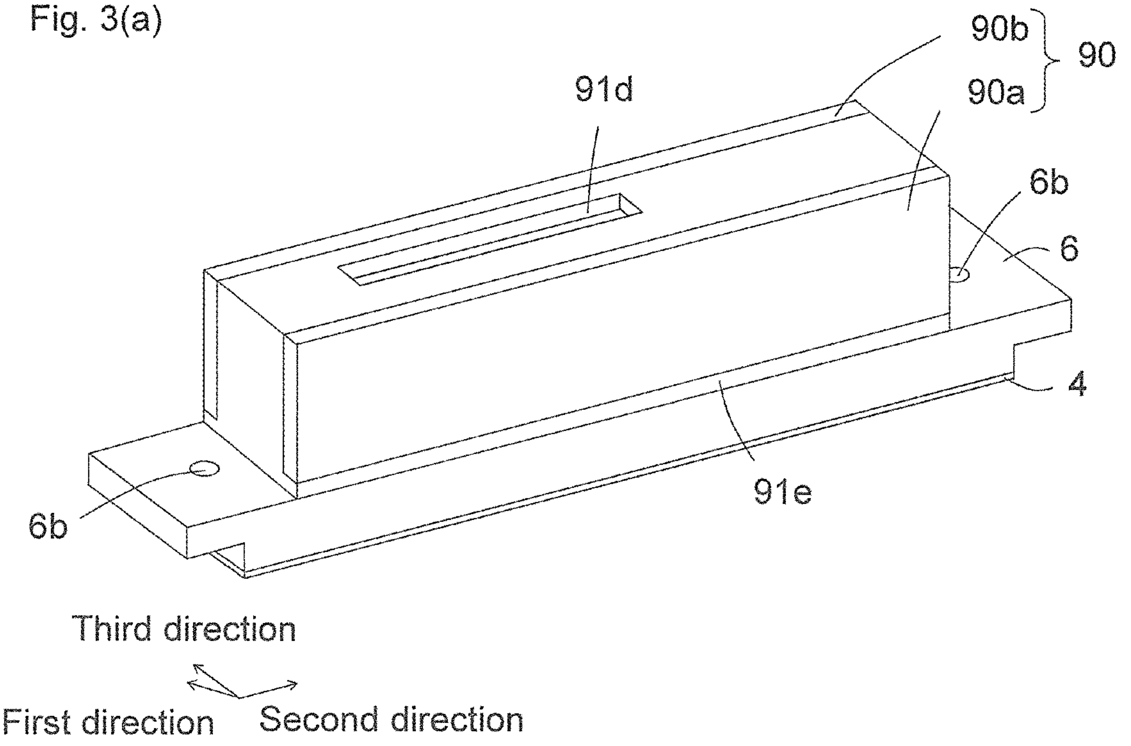
FIG. 3(*a*) is a perspective view of the liquid discharge head shown in FIG. 1, and FIG. 3(*b*) is a sectional view thereof.
Figure 3B:
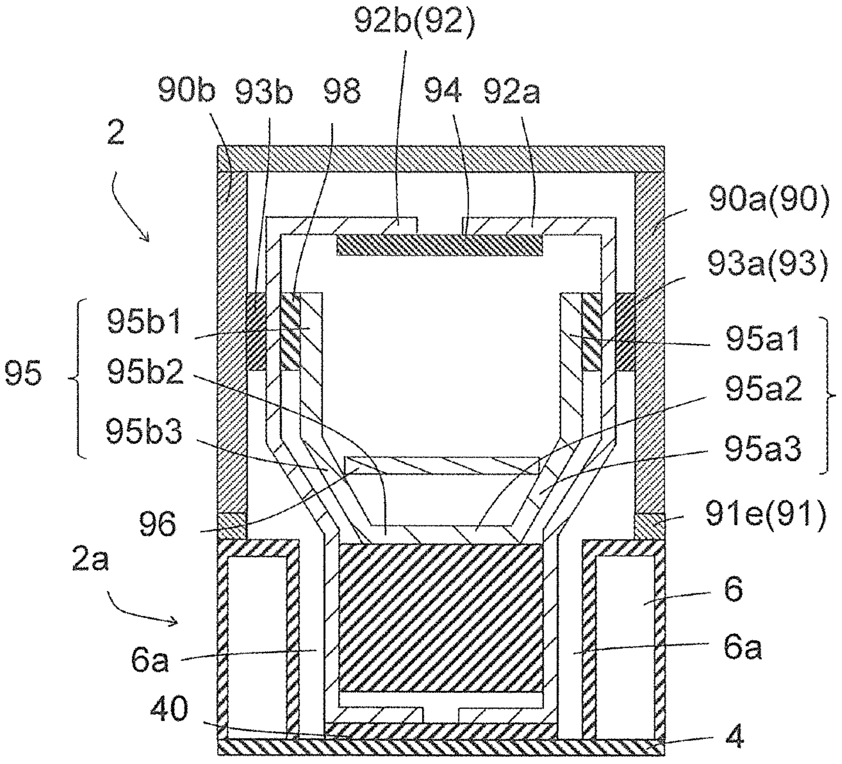

The pressing member 97 includes a first member 95 and a second member 96 (refer to FIG. 3(*b*)). The pressing member 97 presses the driver IC 93 against the heat sink 90 with an elastic member 98 and the signal transmission member 92 interposed therebetween. This ensures that the heat generated in the driver IC 93 due to driving is efficiently dissipated to the heat sink 90.

The first member 95 includes a first pressing part 95*a*1, a second pressing part 95*b*1, connection parts 95*a*2 and 95*b*2, a first inclined part 95*a*3, and a second inclined part 95*b*3.

The first pressing part 95*a*1 is disposed opposite to the first driver IC 93*a*. The second pressing part 95*b*1 is disposed opposite to the second driver IC 93*b*. The connection parts 95*a*2 and 95*b*2 are disposed on the primary flow channel member 6. The first inclined part 95*a*3 is disposed on at least a part of a region between the first pressing part 95*a* and the connection parts 95*a*2 and 95*b*2, and is disposed so as to incline inward. The second inclined part 95*b*3 is disposed on at least a part of a region between the second pressing part 95*a* and the connection parts 95*a*2 and 95*b*2, and is disposed so as to incline inward.

The first member 95 is disposed in a U-shape whose upper side is opened in a section view. The first pressing part 95*a*1 is disposed on the side of the first heat sink 90*a*, and the second pressing part 95*b*1 is disposed on the side of the second heat sink 90*b*. The first pressing part 95*a*1 presses the first driver IC 93*a* against the first heat sink 90*a*, and the second pressing part 95*b*1 presses the second driver IC 93*b* against the second heat sink 90*b*.

The pressing parts 95*a*1 and 95*b*1 are disposed opposite to the driver IC 93, and are disposed so as to extend vertically. Here, the pressing parts 95*a*1 and 95*b*1 indicate regions of the first member 95 which are disposed opposite to the driver IC 93.

The connection parts 95*a*2 and 95*b*2 are disposed on the primary flow channel member 6, and are fixed to the primary flow channel member 6 by a screw or the like.

The inclined parts 95*a*3 and 95*b*3 are respectively disposed so as to connect the pressing parts 95*a*1 and 95*b*1 and the connection parts 95*a*2 and 95*b*2, and at least a part of a region between the pressing parts 95*a*1 and 95*b*1 and the connection parts 95*a*2 and 95*b*2 is disposed so as to incline relative to a vertical direction and a horizontal direction.

The first member 95 is formed by integrally disposing the first pressing part 95*a*1, the second pressing part 95*b*1, the connection parts **95*a*2 and 95*b*2, the first inclined part 95*a*3, and the second inclined part 95*a*3. The connection parts 95*a*2 and 95*b*2 are connected to the primary flow channel member 6. Therefore, by pressing the first inclined part 95*a*3 and the second inclined part 95*b*3 toward the head body 2*a* with the second member 96 interposed therebetween, it is ensured that the first pressing part 95*a*1 presses the first driver IC 93*a* against the first heat sink 90*a*, and the second pressing part 95*b*1 presses the second driver IC 93*b* against the second heat sink 90*b***.

The first member 95 is preferably made elastically deformable, and is formable from, for example, metal, an alloy, or a resin. Alumite treatment may be carried out to improve heat dissipation.

The second member 96 has a rectangular shape in a plan view, and is disposed across the first inclined part **95*a*3 and the second inclined part 95*b*3 of the first member 95. That is, long sides of the second member 96 are disposed on the inclined parts 95*a*3 and 95*b*3, and it is therefore possible to press the inclined parts 95*a*3 and 95*b*3 toward the head body 2*a* by pressing the second member 96 toward the head body 2*a***.

The second member 96 preferably has higher rigidity than the first member 95 in order to elastically deform the first member 95. The second member 96 is formable from, for example, metal, an alloy, or a resin material.

The elastic member 98 is disposed on the pressing parts **95*a*1 and 95*b*1, and is disposed between the signal transmission member 92 and the pressing parts 95*a*1 and 95*b*1. The likelihood that the pressing parts 95*a*1 and 95*b*1 cause damage to the signal transmission member 92 is reducible by disposing the elastic member 98. For example, a double sided foam tape can be exemplified as the elastic member 98. The elastic member 98** does not necessarily need to be disposed.

A method of manufacturing the liquid discharge head 2 is described below.

One end portion of the signal transmission member 92 having the driver IC 93 mounted thereon is electrically connected to the actuator board 40 by joining the actuator board 40 to the secondary flow channel member 4. Then, the primary flow channel member 6 and the secondary flow channel member 4 are joined together in a state in which the other end portion of the signal transmission member 92 is inserted into the opening **6*a* of the primary flow channel member 6. The head body 2*a* and the primary flow channel member 6** are manufactured.

Subsequently, the first member 95 of the pressing member 97 is joined onto the primary flow channel member 6. The connection parts **95*a*2 and 95*b*2 of the first member 95 are mounted at a middle part in a width direction of the head body 2*a*, and the connection parts 95*a*2 and 95*b*2 are screwed to the head body 2*a*. Then, the second member 96 is mounted on the first member 95 so as to be located between the first pressing part 95*a*1 and the second pressing part 95*b*1. On this occasion, the second member 96 is mounted so as to be displaceable toward the head body 2*a*. Then, the wiring board 94 is mounted on a support part (not shown), and the other end portion of the signal transmission member 92 is fitted into a connector (not shown) provided on the wiring board 94**.

Subsequently, the casing 91 is mounted on the head body **2*a* from above. On that occasion, the casing 91 is mounted on the head body 2*a* so that the signal transmission member 92 and the wiring board 94 are located at the third opening 91*c* provided in the lower surface of the casing 91. This ensures that the driver IC 93 is accommodated in the casing 91. At this time, because the second member 96 are not pressing the inclined parts 95*a* and 95*b*3 of the first member 95, the pressing parts 95*a*1 and 95*b*1 are configured so as not to protrude sideward. This leads to such a configuration that a frame body 91*a* of the casing 91 and the driver IC 93 are less apt to come into contact with each other, thereby making it possible to reduce the likelihood that damage can occur on the driver IC 93**.

Then, the second member 96 is pressed toward the head body **2*a* by interposing therebetween the first opening 91*a* and the second opening 91*b* of the casing 91. Consequently, deformation occurs in the first member 95, and the pressing parts 95*a*1 and 95*b*1 deform sideward. It follows that the pressing member 97 is fixed with the pressing parts 95*a*1 and 95*b*1** protruded sideward.

Subsequently, the heat sink 90 is disposed oppositely to the first opening **91*a* and the second opening 91*b* of the casing 91, and the heat sink 90 is disposed on the thermal insulation part 91*e*. The heat sink 90 is then fixed to the casing 91 by screwing the heat sink 90 to the casing 91. It follows that the driver IC 93 is pressed toward a middle part by the heat sink 90 and then displaces toward the middle part while coming into contact with the heat sink 90. Consequently, the driver IC 93 is pressed toward the heat sink 90 by the pressing member 97**.

Thus, by pressing the second member 96 toward the head body **2*a* after the driver IC 93 is accommodated in the casing 91, it is ensured that the pressing parts 95*a*1 and 95*b*1 are pressed toward the heat sink 90. It is consequently possible to reduce the likelihood that during assembly of the liquid discharge head 2, the casing 91 and the driver IC 93 come into contact with each other and damage occurs in the driver IC 93**.

That is, it is possible to cause the pressing parts **95*a*1 and 95*b*1 to protrude sideward by pressing the second member 96 toward the head body 2*a* with the first opening 91*a* and the second opening 91*b* on the side surface of the casing 91 interposed therebetween after mounting the casing 91 under the condition that the pressing parts 95*a*1 and 95*b*1 are not protruded sideward when mounting the casing 91. This leads to the structure that the driver IC 93 is pressed against the heat sink 90 by the pressing member 97 while reducing the likelihood that the driver IC 93 and the frame body 91*a* come into contact with each other, thereby improving heat dissipation of the driver IC 93**.

The driver IC 93 generates heat by driving the liquid discharge head 2. When the casing 91 is formed from a resin, the casing 91 has low heat dissipation, and the heat sink 90 is disposed so as to be in contact with the driver IC 93 in order to dissipate the heat of the driver IC 93.

The heat transferred from the driver IC 93 to the heat sink 90 is dissipated from the heat sink 90 to the exterior, whereas the heat can be transferred toward the discharge hole 8 of the secondary flow channel member 4 of the head body **2*a* (refer to FIG. 5). The temperature of a liquid when being discharged affects viscosity or the like of the liquid, and therefore need to be a low temperature of approximately 30-60° C. It is necessary to reduce the amount of heat of the heat sink 90 to be transferred to the discharge hole 8**.

The liquid discharge head 2 has such a structure that the thermal insulation part **91*e* is disposed between the heat sink 90 and the head body 2*a*. Hence, the heat transferred from the driver IC 93 to the heat sink 90 is insulated by the thermal insulation part 91*e*, thereby reducing the likelihood of heat transfer to the head body 2*a*. It is therefore possible to reduce the likelihood of heat transfer to the discharge hole 8 of the secondary flow channel member 4** of the head body 2*a*, thereby reducing the likelihood of a temperature rise in the vicinity of the discharge hole 8.

The liquid discharge head 2 also includes the primary flow channel member 6 as a liquid supply member which is disposed on the head body 2*a* and configured to supply the liquid to the head body 2*a*. The primary flow channel member 6 is disposed between the thermal insulation part 91*e* and the heat sink 90. Therefore, the primary flow channel member 6 located between the head body 2*a* and the heat sink 90 functions as a thermal insulation member, thereby further reducing the likelihood that the heat transferred from the driver IC 93 to the heat sink 90 transfers to the head body 2*a*.

In the liquid discharge head 2, a thermal conductivity of the thermal insulation part 91*e* is lower than a thermal conductivity of the primary flow channel member 6. Accordingly, the heat of the heat sink 90 is insulated by the thermal insulation part 91*e* having the lower thermal conductivity, thus ensuring efficient thermal insulation between the heat sink 90 and the head body 2*a*.

Furthermore, the thermal insulation part 91*e* is preferably formed integrally with the casing 91, and the thermal conductivity of the casing 91 is preferably lower than the thermal conductivity of the primary flow channel member 6. Thus, the thermal insulation part 91*e* can be formed integrally with the casing 91 without being separately formed, and the number of members is reducible.

When the casing 91 is formed from a resin, the thermal conductivity of the casing 91 is settable to, for example, 0.3-0.8 (W/m° C.). When the primary flow channel member 6 is formed from a resin, the thermal conductivity of the primary flow channel member 6 is settable to, for example, 0.5-1.0 (W/m° C.).

In the liquid discharge head 2, a coefficient of linear expansion of the thermal insulation part 91*e* is larger than a coefficient of linear expansion of the primary flow channel member 6. Therefore, even when thermal expansion occurs in the heat sink 90, it is possible to reduce the likelihood that a clearance occurs between the thermal insulation part 91*e* and the heat sink 90. Hence, sealing performance of the liquid discharge head 2 is retainable.

It is more preferable that the thermal insulation part 91*e* is formed integrally with the casing 91, and the coefficient of linear expansion of the casing 91 is larger than the coefficient of linear expansion of the primary flow channel member 6. This makes it possible to improve the sealing performance of the casing 91.

When the casing 91 is formed from a resin, the coefficient of linear expansion of the casing 91 is settable to, for example, $1.5\text{-}2.7\times10^{-5}$. When the primary flow channel member 6 is formed from a resin, the coefficient of linear expansion of the primary flow channel member 6 is settable to, for example, $0.8\text{-}1.2\times10^{-5}$. When the heat sink 90 is formed from aluminum subjected to alumite treatment, a coefficient of linear expansion of the heat sink 90 is, for example, $2.2\text{-}2.4\times10^{-5}$. It is possible to approximate the coefficient of linear expansion of the heat sink 90 and the coefficient of linear expansion of the casing 91. The sealing performance of the casing 91 is therefore retainable.

As shown in FIG. 3(*b*), the primary flow channel member 6 includes the primary supply flow channel 22 through which a liquid is supplied to the head body 2*a*, and the primary recovery flow channel 26 through which the liquid is recovered from the head body 2*a*. The primary supply flow channel 22 and the primary recovery flow channel 26 are disposed between the thermal insulation part 91*e* and the head body 2*a*. This ensures that the liquid flowing through the primary supply flow channel 22 and the primary recovery flow channel 26 functions as a thermal insulation material, thereby further reducing the likelihood that the heat transferred to the heat sink 90 transfers to the head body 2*a*.

Alternatively, only the primary supply flow channel 22 of the primary flow channel member 6 may be disposed between the heat sink 90 and the head body 2*a*. In this case, the liquid flowing through the primary supply flow channel 22 is preheatable.

Figure 6A:
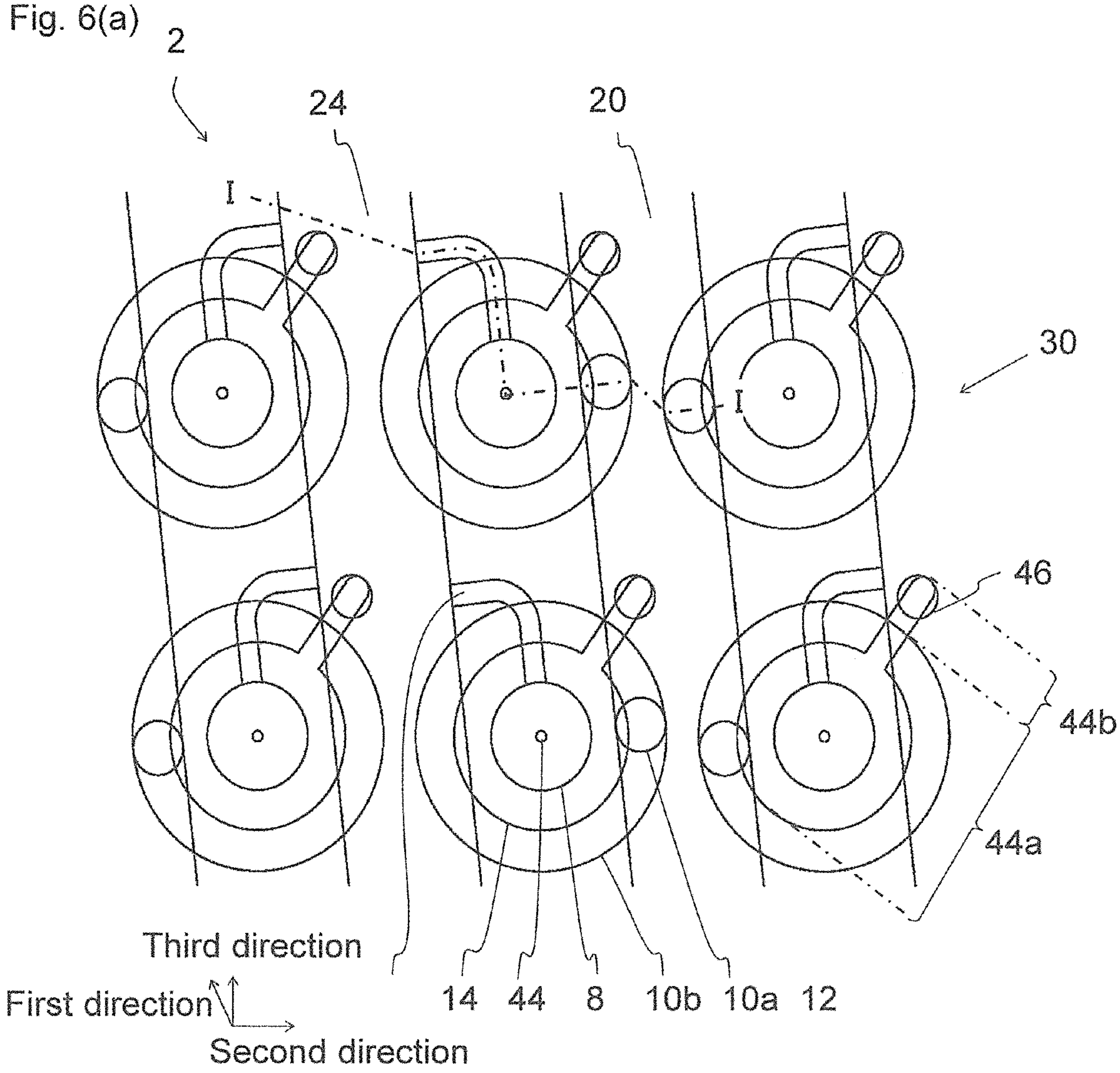
FIG. 6(*a*) is an enlarged plan view that shows in enlarged dimension a part of the liquid discharge head shown in FIG. 5, and FIG. 6(*b*) is a sectional view taken along line VI(b)-VI(b) shown in FIG. 5(*a*)
Figure 6B:
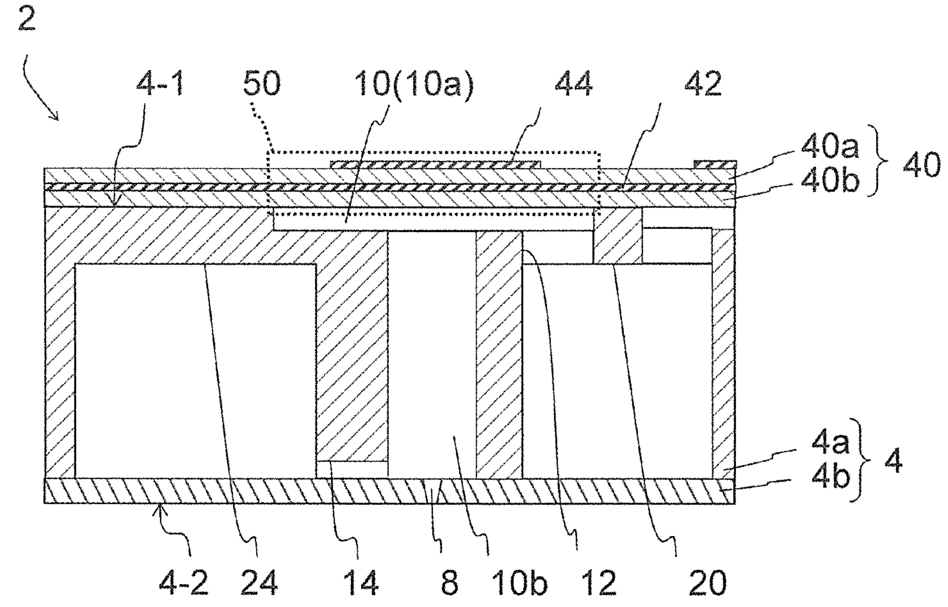

Individual members constituting the head body 2*a* and the primary flow channel member 6 are described below with reference to FIGS. 4 to 6.

Figure 2:
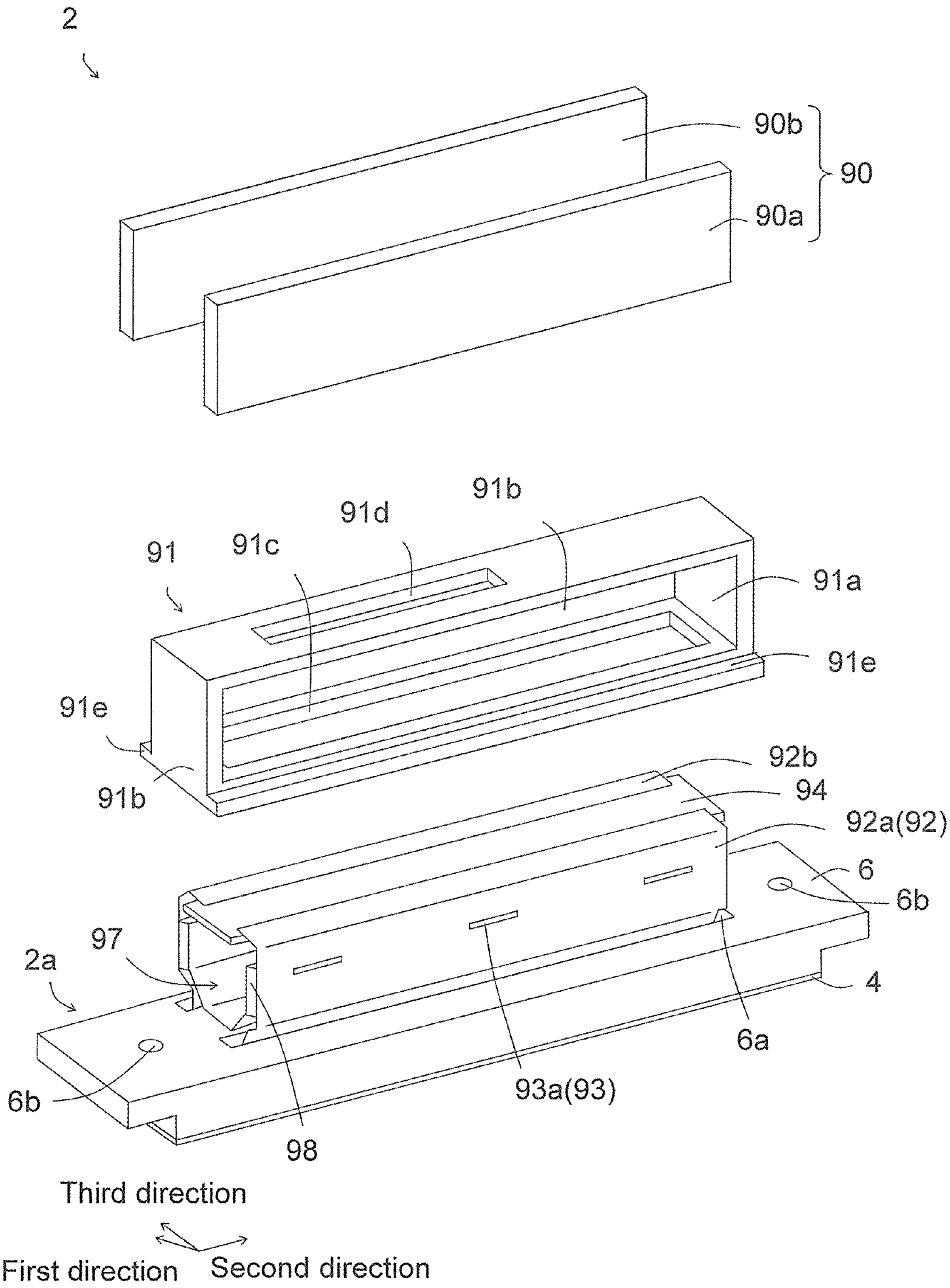
FIG. 2 is an exploded perspective view that shows the liquid discharge head shown in FIG. 1.

The head body 2*a* includes the secondary flow channel member 4 and the actuator board 40 as shown in FIG. 2. The actuator board 40 is disposed in a discharge region 32 of the secondary flow channel member 4, and the signal transmission member 92 is electrically connected to the actuator board 40.

The primary flow channel member 6 is formed so as to extend along the second direction, and includes therein the primary supply flow channel 22 and the primary recovery flow channel 26. The primary supply flow channel 22 and the primary recovery flow channel 26 are disposed so as to extend in the second direction.

The primary flow channel member 6 includes the opening 6*a* extending along the second direction, and openings 6*b* respectively disposed at both ends in the second direction. The signal transmission member 92 is drawn out upward from the opening 6*a*. The primary flow channel member 6 is formable by laminating plates having an opening and a groove formed therein. These plates are formable from metal, an alloy, or a resin. Alternatively, these plates may be integrally formed from the resin.

The primary supply flow channel 22 is communicated with one of the openings 6*b* in the second direction by interposing therebetween a first opening 20*a* of the secondary flow channel member 4 and a communication part (not shown), and is configured to supply the liquid from the exterior to the secondary flow channel member 4. The primary recovery flow channel 26 is communicated with a second opening 24*a* of the secondary flow channel member 4 by interposing therebetween the other opening 6*b* in the second direction and a communication part (not shown), and is configured to recover the liquid from the secondary flow channel member 4.

As described later in detail, the secondary flow channel member 4 includes a discharge element 30, and is provided with a flow channel through which a liquid is discharged. The first opening 20*a* and the second opening 24*a* are formed on a surface of the secondary flow channel member 4, and the discharge region 32 is formed in a region where neither the first opening 20*a* nor the second opening 24*a* is disposed.

The actuator board 40 is disposed in the discharge region 32, and is joined to the secondary flow channel member 4 by an adhesive or the like. A connection electrode 46 is disposed on a surface of the actuator board 40, and the connection electrode 46 is electrically connected to the signal transmission member 92. The connection electrode 46 is electrically connected to the signal transmission member 92 by a solder bump formed from metal, such as Ag, Pd, and Au, or an alloy, or alternatively by a resin bump.

The secondary flow channel member 4 and the actuator board 40 are described below with reference to FIGS. 5 and 6. For simplicity's sake, a line that should be indicated by a broken line is also indicated by a solid line in FIGS. 5 and 6(*a*).

The secondary flow channel member 4 includes a secondary flow channel member body 4*a* and a nozzle plate 4*b*, and is provided with a pressurizing chamber surface 4-1 and a discharge hole surface 4-2. The actuator board 40 is disposed on the pressurizing chamber surface 4-1, and both are jointed together. The secondary flow channel member body 4*a* is formable by laminating plates having an opening and a groove formed therein, and these plates are formable from metal, an alloy, or a resin. The secondary flow channel member 4 may be integrally formed of a resin.

The secondary flow channel member 4 includes secondary supply flow channels 20, first openings 20*a*, secondary recovery flow channels 24, second openings 24*a*, and discharge elements 30. The secondary supply flow channel 20 and the secondary recovery flow channel 24 are disposed along the first direction and arranged alternately in the second direction.

The discharge elements 30 are disposed in a matrix form so as to extend along the first direction and the second direction in the discharge region 32 of the secondary flow channel member 4.

The discharge element 30 includes a pressurizing chamber 10, an individual supply flow channel 12, a discharge hole 8, and an individual recovery flow channel 14. The pressurizing chamber 10 includes a pressurizing chamber body 10*a* and a partial flow channel 10*b*. The pressurizing chamber body 10*a*, the partial flow channel 10*b*, the individual supply flow channel 12, the discharge hole 8, and the individual recovery flow channel 14 are communicated with and fluidly connected to one another.

The pressurizing chamber 10 includes a pressurizing chamber body 10*a* and a partial flow channel 10*b*. The pressurizing chamber body 10*a* is disposed facedly to the pressurizing chamber surface 4-1, and is subjected to pressure from a displacement element 50. The pressurizing chamber body 10*a* has a right circular cylinder shape whose planar form is a circular form. Because the planar form is the circular form, it is possible to ensure a large displacement when the displacement element 50 is deformed by the same force, as well as a large volume change of the pressurizing chamber 10 due to the displacement.

The partial flow channel 10*b* is a hollow region being connected to the discharge hole 8 that opens into the discharge hole surface 4-2 from below the pressurizing chamber body 10*a*. The partial flow channel 10*b* has a right circular cylinder shape whose diameter is smaller than that of the pressurizing chamber body 10*a* and whose planar form is a circular form. When the partial flow channel 10*b* is viewed from the pressurizing chamber surface 4-1, the partial flow channel 10*b* is disposed so as to be accommodated in the pressurizing chamber body 10*a*.

A plurality of the pressurizing chambers 10 constitute a plurality of pressurizing chamber columns 11A along the first direction, and constitute a plurality of pressurizing chamber rows 11B along the second direction. Each of the discharge holes 8 is located at the center of the corresponding pressurizing chamber body 10*a*. Similarly to the pressurizing chambers 10, a plurality of the discharge holes 8 constitute a plurality of discharge hole columns 9A along the first direction, and constitute a plurality of discharge hole rows 9B along the second direction. Preferably, the first direction is inclined relative to the second direction, and an angle formed by the first direction and the second direction is 45-90°.

When the discharge holes 8 are projected in a direction orthogonal to the second direction in FIG. 5, 32 discharge holes 8 are projected in a range of an imaginary straight line R, and these discharge holes 8 are arranged at intervals of 360 dpi inside the imaginary straight line R. This makes it possible to perform printing at a resolution of 360 dpi by transporting the printing paper P in a direction orthogonal to the imaginary straight line R, followed by printing.

The actuator board 40 including the displacement elements 50 is joined onto an upper surface of the secondary flow channel member 4, and these displacement elements 50 are respectively disposed so as to be located on the pressurizing chambers 10. The actuator board 40 occupies a region having approximately the same form as the discharge region 32 where the discharge elements 30 are arranged. An opening of each of the pressurizing chamber bodies 10*a* is closed because the actuator board 40 is joined onto the pressurizing chamber surface 4-1 of the flow channel member 4.

The actuator board 40 has a rectangular shape that is long in the second direction as is the case with the head body 2*a*. Although described in detail later, the signal transmission member 92 for supplying signals to the displacement elements 50 is connected to the actuator board 40.

The actuator board 40 includes piezoelectric ceramic layers 40*a* and 40*b*, a common electrode 42, an individual electrode 44, and a connection electrode 46. The actuator board 40 is configured by laminating the piezoelectric ceramic layer 40*b*, the common electrode 42, the piezoelectric ceramic layer 40*a*, and the individual electrode 44. A region where the common electrode 42 and the individual electrode 44 are opposed to each other with the piezoelectric ceramic layer 40 interposed therebetween functions as the displacement element 50.

The common electrode 42 is disposed between the piezoelectric ceramic layers 40*a* and 40*b*, and is disposed over the entire region of the piezoelectric ceramic layers 40*a* and 40*b*. The individual electrode 44 includes an individual electrode body 44*a* and an extraction electrode 44*b*. The individual electrode body 44*a* is disposed on the pressurizing chamber 10 and disposed correspondingly to the pressurizing chamber 10. The extraction electrode 44*b* is extracted from the individual electrode body 44*a* to an outer side close to the pressuring chamber 10.

The connection electrode 46 is formed at a portion extracted beyond a region facing the pressurizing chamber 10 on the extraction electrode 44*b*. The connection electrode 46 is made of, for example, silver-palladium containing glass frit, and is formed in a convex shape with a thickness of approximately 15 μm. The connection electrode 46 is electrically connected to the bump disposed on the signal transmission member 92.

A liquid flow in the liquid discharge head 2 is described below. A liquid supplied from the exterior is supplied from the opening 6*b* of the primary flow channel member 6 and flows through the primary supply flow channel 22. The liquid flowing through the primary supply flow channel 22 is then supplied to the first opening 20*a* of the secondary flow channel member 4. It therefore follows that the liquid flowing through the primary supply flow channel 22 is individually branched toward the first opening 20*a*.

The liquid being supplied to the first opening 20*a* flows into each of the individual supply flow channels 12 while flowing through the secondary supply flow channel 24 along the first direction. It therefore follows that the liquid flowing through the secondary supply flow channel 24 is individually branched toward the discharge elements 30.

The liquid flowing through the individual supply flow channel 12 then flows into the pressurizing chamber body 10*a* and flows downward through the partial flow channel 12 while being subjected to a pressure from the displacement element 50. The liquid is then discharged from the discharge hole 8 when the liquid reaches a tip of the partial flow channel 12.

The liquid not discharged from the discharge hole 8 flows through the individual recovery flow channel 14 and is recovered into the secondary recovery flow channel 24. The secondary recovery flow channel 24 recovers the liquid from the individual recovery flow channel 14 while flowing along the first direction. The liquid flowing out of the second opening 24*a* is then recovered by the primary recovery flow channel 26 of the primary flow channel member 6. Subsequently, the liquid is recovered through the second opening 24*a* while flowing through the primary recovery flow channel 26 along the second direction, and the recovered liquid is then discharged from the opening 6*b* to the exterior.

Second Embodiment

A liquid discharge head 102 according to a second embodiment is described below with reference to FIG. 7. The same components are identified by the same reference numerals.

The liquid discharge head 102 further includes a heat transfer member 99. The heat transfer member 99, the heat sink 90, and the casing 91 are screwed together by a screw 101.

The casing 91 includes a first fixing part 91*f* and a second fixing part 91*g* respectively on both ends in the second direction. The first fixing part 91*f* is disposed adjacent to the first heat sink 90*a*, and the second fixing part 91*g* is disposed adjacent to the second heat sink 90*b*.

The heat transfer member 99 is disposed between the first fixing part 91*f* adjacent to the first heat sink 90*a* and the second fixing part 91*g* adjacent to the second heat sink 90*b*. The heat transfer member 99 includes a first portion 99*a*, a second portion 99*b*, and a coupling portion 99*c*. The first portion 99*a* is disposed so as to face the first fixing part 91*f*. The second portion 99*b* is disposed so as to face the second fixing part 99*g*. The coupling portion 99*c* couples the first portion 99*a* and the second portion 99*b*, and is disposed on the primary flow channel member 6.

Figure 7A:
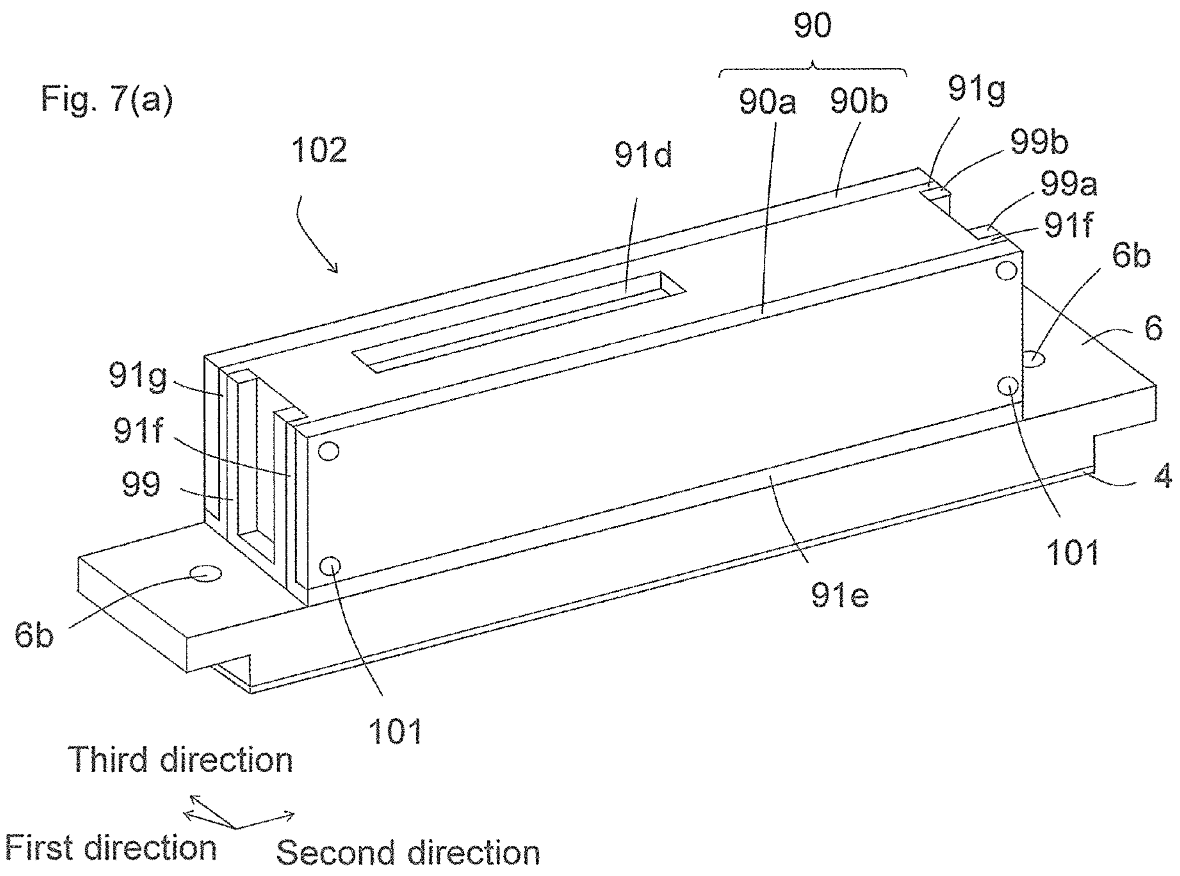
FIG. 7(*a*) is a perspective view of a liquid discharge head according to a second embodiment, and FIG. 7(*b*) is a side view thereof.
Figure 7B:
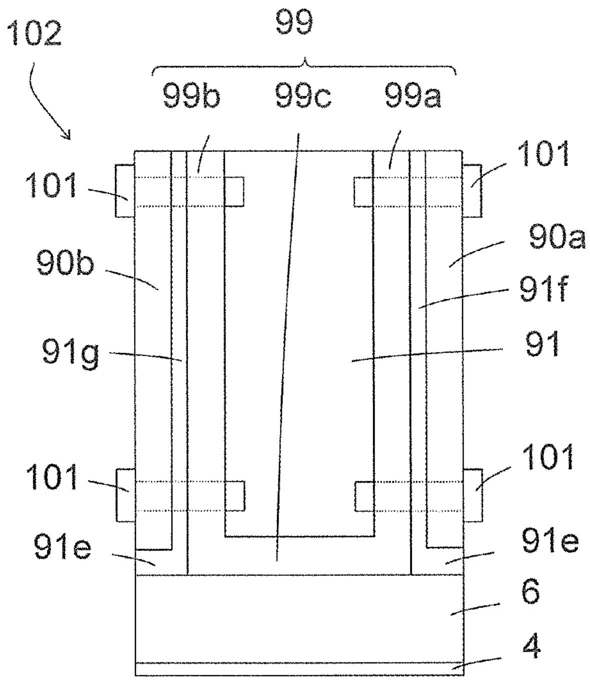

As shown in FIG. 7(*b*), the heat sink 90, the heat transfer member 99, and the casing 91 are screwed together by the screw 101. Specifically, the first fixing part 91*f* and the second fixing part 91*g* are sandwiched by the heat sink 90 and the heat transfer member 99. Thereby, the first heat sink 90*a* and the second heat sink 90*b* are thermally connected to each other by the heat transfer member 99.

More specifically, the first heat sink 90*a* and the first portion 99*a* facing the first heat sink 90*a* are thermally connected to each other by the screw 101, and the second heat sink 90*b* and the second portion 99*b* facing the second heat sink 90*b* are thermally connected to each other by the screw 101. In the heat transfer member 99, the first portion 99*a* and the second portion 99*b* are thermally connected to each other by the coupling portion 99*c*. Thereby, the first heat sink 90*a* and the second heat sink 90*b* are thermally connected to each other by the heat transfer member 99.

The heat transfer member 99 is formable from metal or an alloy, and is formable from, for example, SUS. The screw 101 is formable from metal or an alloy.

In the liquid discharge head 102, the amount of heat generation of the driver IC 93 (refer to FIG. 3) can differ depending on an image to be printed. That is, assuming that the first driver IC 93*a* supplies a driving signal to the head body 2*a* for causing a large amount of liquid drop discharge, and the second driver IC 93*b* supplies little or no driving signal to the head body 2*a*, the heat generation of the first driver IC 93*a* can be more than the heat generation of the second driver IC 93*b*. In this case, a large amount of heat can be dissipated to the first heat sink 90*a*, and little or no heat can be dissipated to the second heat sink 90*b*. Accordingly, the amount of heat generation to be dissipated to the heat sink 90 can differ between the first heat sink 90*a* and the second heat sink 90*b*.

While the liquid discharge head 102 has the configuration that the first heat sink 90*a* and the second heat sink 90*b* are thermally connected to each other by the heat transfer member 99. Therefore, when the amount of heat generation of the first heat sink 90 is large, it follows that the heat of the first heat sink 90*a* transfers to the second heat sink 90*b* through the heat transfer member 99. This makes it possible to dissipate the heat of the first heat sink 90*a* by the second heat sink 90*b*, thus leading to improved heat dissipation of the heat sink 90.

The heat transfer member 99 includes a first portion 99*a*, a second portion 99*b*, and a coupling portion 99*c*. The casing 91 includes a first fixing part 91*f* and a second fixing part 91*b*. The first fixing part 91*f* is sandwiched by the first heat sink 90*a* and the first portion 99*a*, and the second fixing part 91*b* is sandwiched by the second heat sink 90*b* and the second portion 99*b*.

It is therefore possible to join the heat sink 90, the casing 91, and the heat transfer member 99 together at the same time. Hence, the liquid discharge head 102 is manufacturable with a small number of steps, thereby reducing manufacturing costs of the liquid discharge head 102.

Additionally, by joining the heat sink 90 and the heat transfer member 99 together by the screw 101, the heat sink 90 and the heat transfer member 99 are thermally connectable to each other. In particular, when the thermal insulation part 91*e* and the casing 91 are formed integrally, the first fixing part 91*f* and the second fixing part 91*g* are adapted to function as a thermal insulation part. However, because the screw 101 penetrate through the first fixing part 91*f* and the second fixing part 91*g*, it is easy to thermally connect the heat sink 90 and the heat transfer member 99.

Moreover, when the casing 91 is formed from a resin material and the heat sink 90 and the heat transfer member 99 are formed from a metal material, strong joining of the heat sink 90 and the heat transfer member 99 is ensured by joining the heat sink 90 and the heat transfer member 99 together by a screw.

The present invention is not limited to the above embodiments, but various changes can be made insofar as they do not depart from the gist of the present invention.

For example, as the pressurizing part, the embodiment that the pressurizing chamber 10 is pressurized by the piezoelectric deformation of the piezoelectric actuator has been exemplified, but not limited thereto. For example, the pressurizing part may be one in which a heating portion is disposed for each of the pressurizing chambers 10. The liquid inside the pressurizing chambers 10 is configured to be heated by the heat of the heating portion, and thermal expansion of the liquid is employed to perform pressurization.

The embodiment that the liquid is supplied from the exterior to the primary supply flow channel 22 and the liquid is recovered from the primary recovery flow channel 26 to the exterior has been exemplified, but not limited thereto. Alternatively, the liquid may be supplied from the exterior to the primary recovery flow channel 26, and the liquid may be recovered from the primary supply flow channel 22 to the exterior. Still alternatively, it may be configured so that the liquid is not circulated through the interior of the head body 2*a*.

DESCRIPTION OF REFERENCE NUMERALS

1 recording device
2 liquid discharge head
2*a* head body
4 secondary flow channel member
6 primary flow channel member (liquid supply member)
8 discharge hole
10 pressurizing chamber
12 individual supply flow channel
14 individual recovery flow channel
20 secondary supply flow channel
22 primary supply flow channel
24 secondary recovery flow channel
26 primary recovery flow channel
30 discharge element
40 actuator board
50 displacement element (pressurizing part)
88 control section
90 heat sink
90*a* first heat sink
90*b* second heat sink
91 casing
91*a* first opening
91*b* second opening
91*c* third opening
91*d* fourth opening
91*e* thermal insulation part
92 signal transmission member
93 driver IC
94 wiring board
95 first member
96 second member
97 pressing member
98 clastic member
99 heat transfer member
99*a* first portion
99*b* second portion
99*c* coupling portion
P printing paper

The invention claimed is:

1. A liquid discharge head, comprising:

a secondary flow channel member comprising a first surface, a second surface opposite to the first surface, a plurality of discharge holes opened in the first surface, and a plurality of pressurizing chambers communicated with the plurality of the discharge holes, and a primary flow channel member is disposed on the second surface, and supplies a liquid to the plurality of the pressurizing chambers, wherein the primary flow channel member comprises a first opening for supplying the liquid to the primary flow channel member and a second opening for collecting the liquid from the primary flow channel member, and the primary flow channel member comprises a flow channel formed of a resin.

2. The liquid discharge head according to claim 1, wherein the secondary flow channel member comprises a plurality of individual supply flow channels for supplying the liquid to the plurality of the pressurizing chambers, and a plurality of individual recovery flow channels for recovering the liquid from the pressurizing chambers from the plurality of the pressurizing chambers.

3. The liquid discharge head according to claim 1, wherein the secondary flow channel member comprises a secondary supply flow channel to which the liquid is supplied from the primary flow channel member, and a secondary recovery flow channel from which the liquid is recovered to the primary flow channel member.

4. The liquid discharge head according to claim 1, wherein the primary flow channel member comprises a primary supply flow channel to which the liquid is supplied from the first opening, and a primary recovery flow channel from which the liquid is recovered to the second opening.

5. The liquid discharge head according to claim 1, wherein the primary flow channel member is integrally formed.

6. The liquid discharge head according to claim 1, wherein the secondary flow channel member comprises metal or an alloy.

7. The liquid discharge head according to claim 1, wherein the secondary flow channel member comprises different materials from the primary flow channel member.

8. The liquid discharge head according to claim 1, wherein the secondary flow channel member comprises a plurality of plates which are mutually laminated.

9. The liquid discharge head according to claim 1, wherein the secondary flow channel member and the primary flow channel member are joined to each other.

10. The liquid discharge head according to claim 1, wherein a thermal conductivity of the primary flow channel member is 0.5-1.0 (W/m° C.).

11. The liquid discharge head according to claim 1, wherein a coefficient of linear expansion of the primary flow channel member is $0.8\text{-}1.2\times10^{-5}$.

12. A recording device, comprising:

the liquid discharge head according to claim 1, a transport section transports a recording medium with respect to the liquid discharge head, and a control section controls the liquid discharge head.

13. The recording device according to claim 12, further comprising a tank, the tank supplies the liquid to the primary flow channel member and recovering the liquid from the primary flow channel member.

* * * * *